United States Patent
Sakata

(10) Patent No.: US 6,631,928 B1
(45) Date of Patent: Oct. 14, 2003

(54) EXPANSION JOINT DEVICE

(75) Inventor: Yuzo Sakata, Tokyo (JP)

(73) Assignee: Asahi Beer Engineering Ltd., Tokyo (JP)

( * ) Notice: Subject to any disclaimer, the term of this patent is extended or adjusted under 35 U.S.C. 154(b) by 0 days.

(21) Appl. No.: 09/720,646

(22) PCT Filed: Feb. 29, 2000

(86) PCT No.: PCT/JP00/01173

§ 371 (c)(1),
(2), (4) Date: Mar. 8, 2001

(87) PCT Pub. No.: WO01/65164

PCT Pub. Date: Sep. 7, 2001

(51) Int. Cl.[7] ............................................. F16L 51/02
(52) U.S. Cl. ...................... 285/226; 285/299; 285/300; 285/301; 92/42; 92/43
(58) Field of Search ................................ 285/226, 299, 285/300, 301, 229, 235; 92/42, 43, 46

(56) References Cited

U.S. PATENT DOCUMENTS

| 523,583 | A | * | 7/1894 | Lynch | 285/45 |
|---|---|---|---|---|---|
| 797,152 | A | * | 8/1905 | Sheckler | 285/12 |
| 1,726,483 | A | * | 8/1929 | Giesler | 285/18 |
| 1,786,506 | A | * | 12/1930 | Ray | 192/60 |
| 2,738,993 | A | * | 3/1956 | Wilson | 285/235 |
| 3,527,481 | A | * | 9/1970 | Lewis | 285/114 |
| 3,606,400 | A | * | 9/1971 | Hines | 285/235 |
| 3,621,674 | A | * | 11/1971 | Ulics et al. | 464/80 |
| 3,851,903 | A | * | 12/1974 | Nienhaus | 285/341 |
| 4,101,150 | A | * | 7/1978 | Thawley et al. | 285/226 |
| 4,350,372 | A | * | 9/1982 | Logsdon | 285/45 |
| 4,536,018 | A | * | 8/1985 | Patarcity | 285/229 |
| 4,700,576 | A | * | 10/1987 | Grare et al. | 73/761 |
| 4,854,611 | A | * | 8/1989 | Press | 285/3 |
| 5,116,087 | A | * | 5/1992 | Hopperdietzel | 285/286 |
| 5,197,188 | A | * | 3/1993 | Maus et al. | 29/888.08 |

FOREIGN PATENT DOCUMENTS

| DE | 1945323 | * | 4/1971 | 285/226 |
|---|---|---|---|---|
| GB | 1324333 | * | 7/1973 | |
| GB | 2029537 | * | 3/1980 | |
| GB | 2107816 | * | 5/1983 | |
| JP | 49-9776 | | 3/1974 | |
| JP | 61-38437 | | 2/1986 | |
| JP | 62-45330 | | 3/1987 | |
| JP | 2-6892 | | 1/1990 | |

* cited by examiner

Primary Examiner—Lynne H. Browne
Assistant Examiner—G M Collins
(74) Attorney, Agent, or Firm—Lawrence E. Laubscher, Jr.

(57) ABSTRACT

Both ends of a bellows-type outer cylinder [31] capable of axial expansion and contraction are connected in a leakproof manner to a pair of connection passage ends [20], thereby constituting an expansion passage [30]. A cylindrical resin film [33] having no permeability to fluid is arranged in an interior of the bellows-type outer cylinder [31], and the axial ends thereof are connected in a leakproof manner to said connecting passage end regions. The cylindrical region [34] positioned in the intermediate region of the cylindrical resin film [33] covers the inner surface of said bellows-type outer cylinder [31] in a leakproof manner. According to such structure, the fluid traveling through said bellows-type outer cylinder [31] and the impurities contained in the fluid are prevented from residing in the grooves formed to the inner circumferential surface of the bellows-type outer cylinder [31], and the cleanness and quality maintaining property of the expansion joint device is secured. In another example, further added to or instead of said bellows-type outer cylinder [31], an inner sleeve and an outer sleeve may be slidably superposed to form an expansion outer cylinder.

24 Claims, 6 Drawing Sheets

EXPANSION JOINT DEVICE

FIELD OF THE INVENTION

The preset invention relates to an expansion joint device connected to piping or equipment and the like that absorbs the expansion and contraction in the longitudinal axial direction and the displacement in the direction orthogonal to the axis thereby protecting the piping system, and especially to an expansion joint device constituting a part of a passage for transmitting fluid that disfavors contamination or quality deterioration, such as drugs, fluid-state food and drinks, and fluid for electronic components.

DESCRIPTION OF THE RELATED ART

Heretofore, expansion bend pipe (tako-bend), bellows (waveform) pipe, slip pipe and the like are known as examples of this type of expansion joint device. The latter two of the examples, the bellows pipe and the slip pipe, characterize in that the distance between the connecting surfaces at the ends of a connecting passage, such as a flange, can be very small.

The problem with the bellows pipe is that when fluid including slurry or fluid having high viscosity travels inside the bellows, impurities enter into the grooves of the bellows, making it impossible for the bellows to perform its primary role, which is to expand, and in cases even lead to breakage of the bellows pipe.

In the attempt to solve the above problems, Japanese Utility Model Laid-Open No. 2-6892 discloses a double (interior and exterior) bellows pipe, the interior bellows pipe being a molded bellows, or Japanese Utility Model Publication No. 49-9776 discloses a bellows pipe equipped with a cylindrical cloth mounted to the interior of the pipe.

According to the disclosure of the former document, though impurities do not easily get caught in the grooves on the inner peripheral surface of the molded bellows, the fluid traveling therein tends to reside in the pipe, causing multiplication of bacteria which is insanitary and could not be applied for drugs or food and drinks. Moreover, if impurity resides in the bellows, the fluid may be contaminated or deteriorated, and therefore it can only be used with limitation for fluid used for electronic components and the like.

According to the latter disclosure, the cylindrical cloth prevents impurities from contacting the inner surface of the bellows, but the fluid removed of the impurities will penetrate through the cylindrical cloth having fluid permeability and reaches the interior surface of the bellows, so the problems related to the bellows pipe mentioned above still exists.

On the other hand, in the case of the slip pipe, the eternal surface of the inner pipe may contact the atmosphere and bacteria may enter the inner pipe via the slide surface between the outer pipe, which generates an insanitary environment.

The present invention aims at solving the above-mentioned problems of the conventional expansion joint device having relatively small distance between connecting surfaces, and to provide an expansion joint device that is especially hygienic and enables to maintain the quality of the fluid traveling inside.

SUMMARY OF THE INVENTION

In order to achieve the above objects, the present invention provides an expansion joint device comprising:

a pair of connecting passage end regions equipped to both axial ends;

an expansion outer cylinder capable of axial expansion and contraction, with one axial end region thereof substantially connected in a leakproof manner to one of the connecting passage end regions and the other axial end region thereof substantially connected in a leakproof manner to the other of the connecting passage end regions; and a cylindrical resin film having no permeability to fluid flowing therethrough, which is substantially cocentrically arranged within the interior of the expansion outer cylinder with one axial end thereof substantially connected in a leakproof manner to one of the connecting passage end regions and the other axial end thereof substantially connected in a leakproof manner to the other of the connecting passage end regions, the cylindrical intermediate region of the cylindrical resin film being arranged to cover the inner surface of the expansion outer cylinder in a leakproof manner.

According to the present invention, no matter whether the expansion outer cylinder is formed as a bellows pipe or a slip pipe, the cylindrical resin film prevents the fluid travelling therethrough from directly getting into contact with the inner surface of the expansion outer cylinder. Therefore, the present invention enables to provide an expansion joint device with an expansion outer cylinder shaped and structured to provide advantageous sanitariness and quality maintaining properties of the fluid flowing therethrough.

The cylindrical resin film is not made of material having fluid permeability such as cloth, but is made of material having no fluid permeability, and may if necessary have elasticity, and should preferably be heat resistant if the fluid traveling through the device must be sterilized using heat.

The actual examples of the cylindrical resin film include silicon, rubber and the like.

The elastic property of the cylindrical resin film is determined appropriately considering the expansion level of the expansion joint device, the tension-resistant power of the cylindrical resin film, the axial stress, and so on. There is also a need to appropriately select the elasticity level of the cylindrical resin film according to the structure of the expansion outer cylinder or the pressure of the flowing fluid. These elements of selection are appropriately determined according to the structure of the expansion joint device and the environment to which it is applied.

It is preferable that the cylindrical resin film is provided with axial pretension. This is to prevent generation of unevenness in the inner surface of the cylindrical resin film due to laxness of the film caused when the expansion joint device is contracted to its minimum length in the axial direction.

In the above invention, the state where the axial end regions of the cylindrical resin film is substantially connected to the connecting passage end regions refers not only to direct connection of the film ends to the connecting passage end regions by welding or bonding, but also to the film ends to be inserted and sandwiched between the connecting passage end region and another connecting member adjacent thereto.

The expansion outer cylinder can either be a prior-art metallic bellows-type outer cylinder, or may be formed of Teflon. In this case, the cylindrical resin film is mounted to the inner side of the bellows-type outer cylinder, and both axial ends thereof are connected to the connecting passage end regions respectively in a leakproof manner.

According to this aspect of the invention, the cylindrical resin film guides the flow of fluid smoothly, and no fluid flows into the grooves formed to the inner surface of the bellows, thereby preventing residence of fluid in the grooves and further preventing deposition of impurities.

Moreover, a plural number of low-hardness elastic resin filling rings may be filled to the spaces defined by grooves formed to the inner peripheral surface of the bellows-type outer cylinder, the inner peripheral surfaces of the rings being connected to form a substantially cylindrical surface. The elastic resin filling rings can be ring-shaped low-hardness elastic resin filling rings that are fit to the grooves formed to the inner surface of the bellows-type outer cylinder, or they can be nonrigid resin filled to the grooves and left for a predetermined time to set.

Accordingly, irrespective of the hardness or the elasticity of the cylindrical resin film, the inner surface of the bellows-type outer cylinder is formed smoothly in a substantial cylindrical shape, so even when the cylindrical resin film expands by fluid pressure, the film will be supported by this smooth cylindrical inner surface, and therefore, the cylindrical resin film will define a smooth inner surface without any residence space for the fluid. Therefore, the sanitariness and the quality of the fluid are maintained.

The plural elastic resin filling rings may be connected and formed integrally, thereby constituting a substantially smooth cylindrical inner surface. This decreases the number of necessary components.

In another aspect of the invention, in addition to the bellows-type outer cylinder, a cylindrical metal sleeve that is cocentrically arranged within the interior of the bellows-type outer cylinder may be applied to the structure. In this case, the cylindrical metal sleeve has one axial end thereof connected to one of the connecting passage end regions in a leakproof manner, the cylindrical resin film having one axial end thereof substantially connected in a leakproof manner to the other free end of the cylindrical metal sleeve and the other axial end thereof substantially connected in a leakproof manner to the other of the connecting passage end regions, the cylindrical resin film together with said cylindrical metal sleeve being arranged to cover the inner surface of the bellows-type outer cylinder in a leakproof manner.

This feature enables a secure protection of the bellows-type outer cylinder by the cylindrical metal sleeve and the cylindrical resin film formed to cover the interior thereof, and further, the expansion and contraction of the bellows-type outer cylinder is absorbed by the expansion and contraction of the cylindrical resin film. Accordingly, the cylindrical metal sleeve provides inner-surface protection of the bellows-type outer cylinder and a smooth guide to the traveling fluid, and therefore enables to reduce the amount of usage of the cylindrical resin film. Further, the elastic resin filling rings can be omitted according to this feature.

In order to prevent expansion of the bellows-type outer cylinder in the radial direction, it is preferable to provide reinforcement rings positioned to the groove regions formed to the outer circumferential surface of the bellows-type outer cylinder. Especially, the effect of providing reinforcement rings is apparent when the bellows is made of polytetrafluoroethylene.

In another aspect of the invention, the expansion outer cylinder may comprise an inner sleeve and an outer sleeve, the axial inner ends of said inner and outer sleeves being cocentrically superposed enabling axial slide movement, the respective outer ends thereof being formed integrally with corresponding connecting passage ends in a leakproof manner, and each ends of the cylindrical resin film being connected in a leakproof manner to a portion of the connecting passage end region and a portion of the inner and outer sleeves respectively, the portion being other than the regions allowing mutual slide movement of both sleeves, the cylindrical resin film being arranged to cover the gap between the inner and outer sleeves. According to this example, at least one of the inner or outer sleeves may be formed to function as the corresponding connecting passage end region.

The mounting of the cylindrical resin film is carried out either by welding or bonding the end of the cylindrical resin film to the connecting passage end, sandwiching the end of the cylindrical resin between the passage end region and an adjacent piping flange, welding or bonding the end of the cylindrical resin to the inner or outer sleeve, or a combination of the above.

Actually, a flare region formed to at least one end of the cylindrical resin film can be sandwiched between and fixed to the corresponding connecting passage end region and a connecting body such as a piping adjacent to the end region. According to this structure, there is no need to weld or bond the cylindrical resin film, and assembly or maintenance of the device is simplified.

At least one of the inner or outer sleeves can be formed to function as a connecting passage end region without being formed separately from the corresponding passage end region, or in other words, the connecting passage end region may be structured to form at least one of the inner or outer sleeves.

Similarly, at least one end of the cylindrical resin film can be fixed integrally to the inner surface of the inner end region of the inner or outer sleeve in a leakproof manner.

When a flare region is formed to at least one end of the cylindrical resin film, the flare region can be formed a bolt inserting hole, and if the connecting passage end region and the connecting body such as a piping adjacent to the end region is connected by a fastening member including a bolt-nut, the bolt can be penetrated through the bolt inserting hole in order to provide a pretension in the axial direction to the cylindrical resin film.

Thereby, when the flare region is pulled into the inner direction, the bolt inserting hole of the flare region is supported by the bolt and prevents loosening of the cylindrical resin film.

The connecting passage end region and the connecting body such as piping adjacent to the end region can be connected together by a screw union joint structure. In this case, the flare region can be provided in advance with an expanded region that fits to a groove formed in advance to the connecting passage end region in the connected state, and thereby provides pretension in the axial direction to the cylindrical resin film.

There are cases where it is preferable to apply highly elastic resin for the cylindrical resin film. For example, product name "ST silicon" manufactured by K. K. Shibata Kogyo-sho is remarkably advantageous in tensile strength, tear strength, elastic elongation limit, durability and so on compared to the general-purpose silicon, and the material is hygienically safe for application to food industry, so it is appropriate for application to food and beverage fluid or electronic component fluid that need hygienic environment and fluid quality maintenance.

Moreover, an air hole is formed to the connecting passage end region for releasing the space formed between the expansion outer cylinder and the cylindrical resin film to the atmosphere. Thereby, the space is ventilated to outer air, and the pressure within the space will not be increased. Further, when the cylindrical resin film may break and inner fluid leaks out to the space, the fluid leaks out of the device through the air hole, and contributes to early discovery of the generation of such abnormal condition and enables prompt correspondence to such situation. The air hole can be a valve.

A device for measuring strain can be mounted on the bellows-type outer cylinder, thereby notifying generation of abnormal strain and advising appropriate correspondence.

According to the present embodiment, the expansion joint device comprises a pair of flanges equipped to both axial ends of the device which also function as a fluid passage, a bellows-type expansion outer cylinder having both axial ends substantially fixed to the flanges and capable of expanding and contracting in the axial direction, and a cylindrical resin film arranged substantially cocentrically within the interior of the expansion outer cylinder, having both ends thereof substantially fixed to the pair of flanges; wherein the bellows-type expansion outer cylinder comprises first flare regions formed to both axial ends of the bellows respectively, one of the first flare regions being substantially connected in a leakproof manner to the axial outer side surface of one of the flanges and the other of the first flare regions being substantially connected in a leakproof manner to the axially outer side surface of the other flange, further comprising reinforcement rings mounted to groove regions formed to the outer peripheral surface of the bellows-type expansion outer cylinder respectively; and the cylindrical resin film comprises second flare regions formed to both axial ends thereof respectively, one of the second flare regions being sandwiched with pressure between one flange and a flange region of an axially adjacent passage region, and the other second flare region being sandwiched with pressure between the other flange and a flange region of an axially adjacent passage.

In this case, the bellows-type expansion outer cylinder can be made of polytetrafluoroethylene, and the bellows-type expansion outer cylinder may be equipped with low-hardness elastic resin filling rings filled to each of the groove regions formed to the inner peripheral surface thereof, respectively. The flange and the flange region of another passage adjacent to the flange can be connected by a bolt-nut-type fastening member, and the second flare regions of the cylindrical resin film can each comprise a hole through which the bolt of the fastening member is inserted, thereby providing pretension to the cylindrical resin film.

The present invention comprises the cylindrical resin film used in the above-explained expansion joint device.

The cylindrical resin film includes a cylindrical body disposed to the innermost space of the expansion joint device for defining a fluid passage; and flare regions connected to both axial ends of the cylindrical body and extending in a disk-shape in the radial direction substantially orthogonal to the axis of the cylindrical body, each being sandwiched between the expansion joint device and another passage axially adjacent thereto.

The cylindrical resin film can be formed so that the expansion joint device and other piping and the like axially adjacent to the device are connected together by a fastening member including a bolt-nut, and the flare regions each comprise a bolt inserting hole through which the bolt is inserted in the connected state.

According to another embodiment, the cylindrical resin film can be formed so that the expansion joint device and other piping and the like axially adjacent thereto are connected together by a screw union joint structure, and the flare regions each comprise an expanded region that fits to grooves formed in advance to the expansion joint device and the other piping and the like.

DETAILED DESCRIPTION OF THE PREFERRED EMBODIMENT

Figure 1:
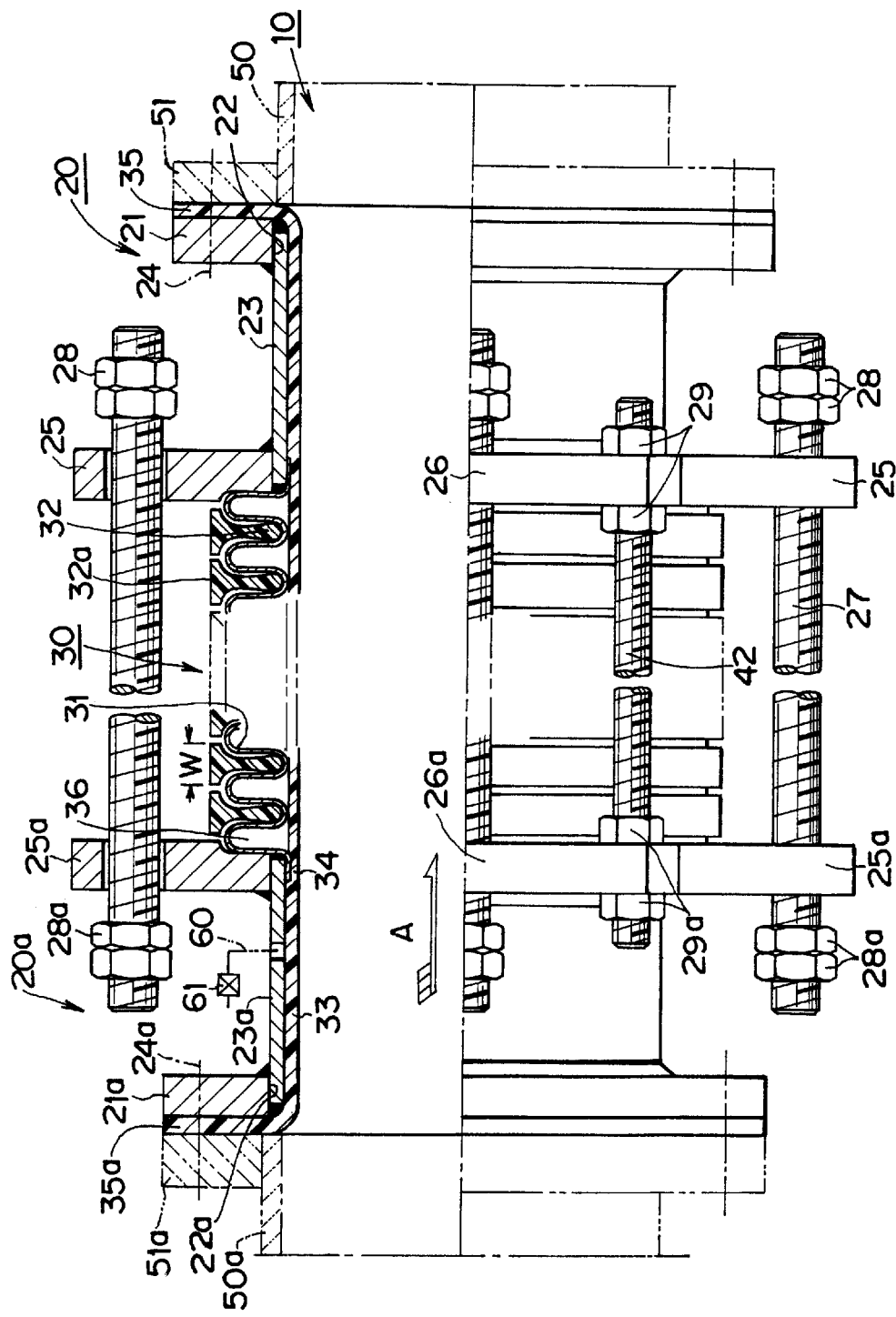
FIG. 1 is a partially cut-off vertical cross-sectional view showing the first embodiment of the expansion joint device according to the present invention.

One embodiment of an expansion joint device according to the present invention is shown in FIG. 1. The embodiment applies an expansion joint device 10 to a piping system for beverage fluid such as beer, wherein the device 10 includes a pair of connecting passage end regions 20 formed on both axial ends of the device 10, and an expansion passage region 30 intervened between the ends.

One of the connecting passage end regions 20 includes a flange 21, a bore 22 formed to the center thereof, and an end pipe 23 having one end region inserted to the bore 22 and welded thereto.

The flange 21 is connected on the same axis line to other adjacent piping or equipment 50 to which the expansion joint device is to be connected (hereinafter called piping and the like) through a flange region 51 formed to connect to the piping and the like 50 and a fastening member 24 such as a known bolt-nut and the like. The other connecting passage end region 20a is similarly connected on the same axis line to other piping and the like 50a, but since the structure of the end region 20a is the same as that of the end region 20, components of the end region 20a is provided with the same reference numbers as those of the former end region 20 accompanied by a letter "a", the explanations thereof being omitted.

On an outer peripheral surface of the end pipe 23, a plural number of mounting arms 25 extending radially outward are welded on equiangular positions around the axis. Connecting bolts 27 are inserted respectively through bores formed to the mounting arms 25, 25a positioned to oppose to each other in the axial direction, and double nuts 28, 28a are screwed onto both end regions of the bolt 27, so as to adjust the maximum distance between the mounting arms 25 and 25a. The mounting arms 25 and 25a receive the elastic restoration force toward the axially outward direction of the expansion passage region 30, presses against inner end surfaces of the double nuts 28, 28a, and defines the axial length of the expansion joint device.

Outer peripheral surfaces on both ends of a bellows-type outer cylinder 31 functioning as an expansion outer cylinder are each connected in a leakproof manner through welding or bonding onto inner surfaces of axially inner end regions of the pair of end pipes 23, 23a, respectively.

The bellows-type outer cylinder 31 is formed for example of stainless steel or Teflon and the like.

Figure 2:
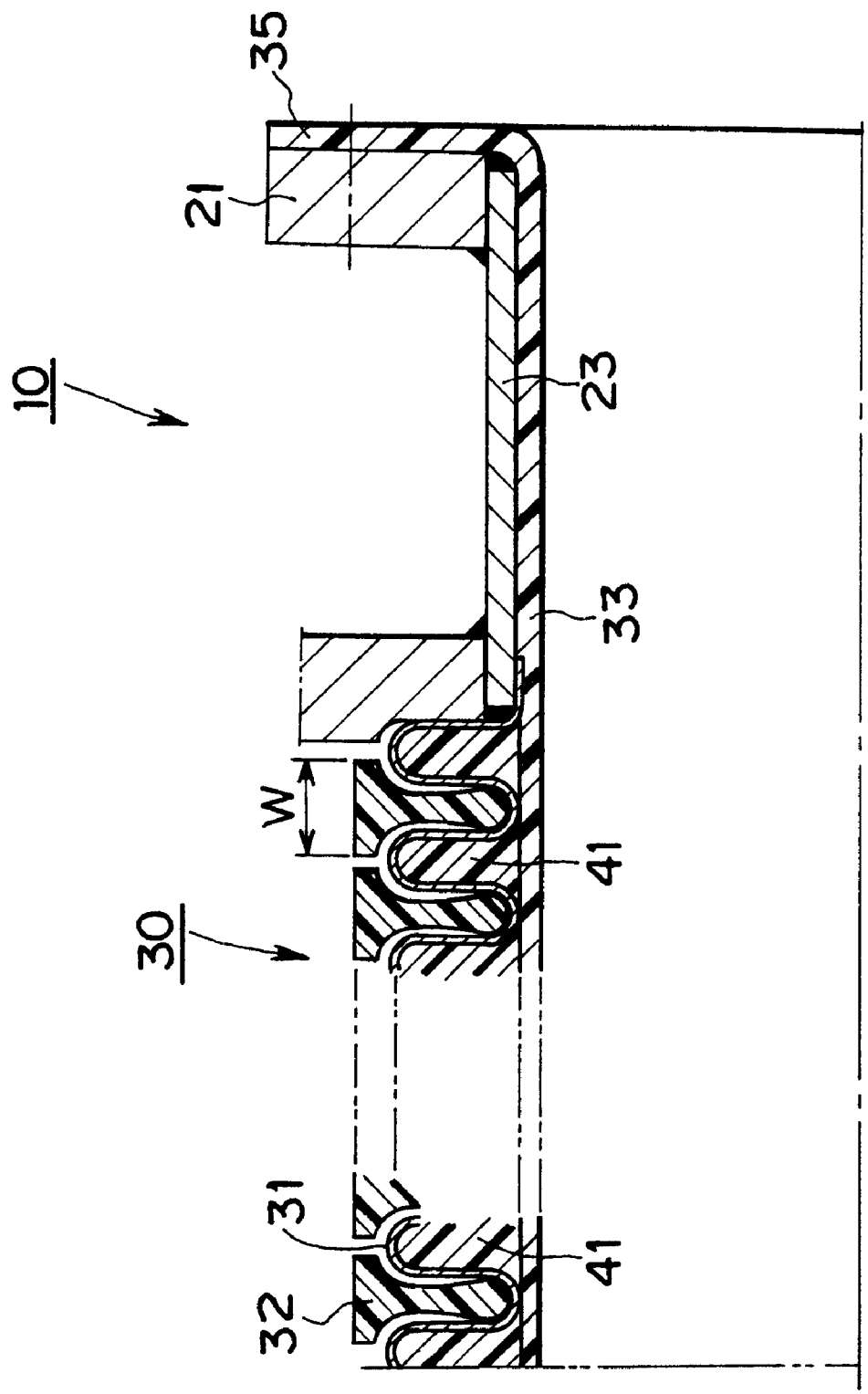
FIG. 2 is a partial vertical cross-sectional view showing the second embodiment of the expansion joint device according to the present invention.
Figure 5:
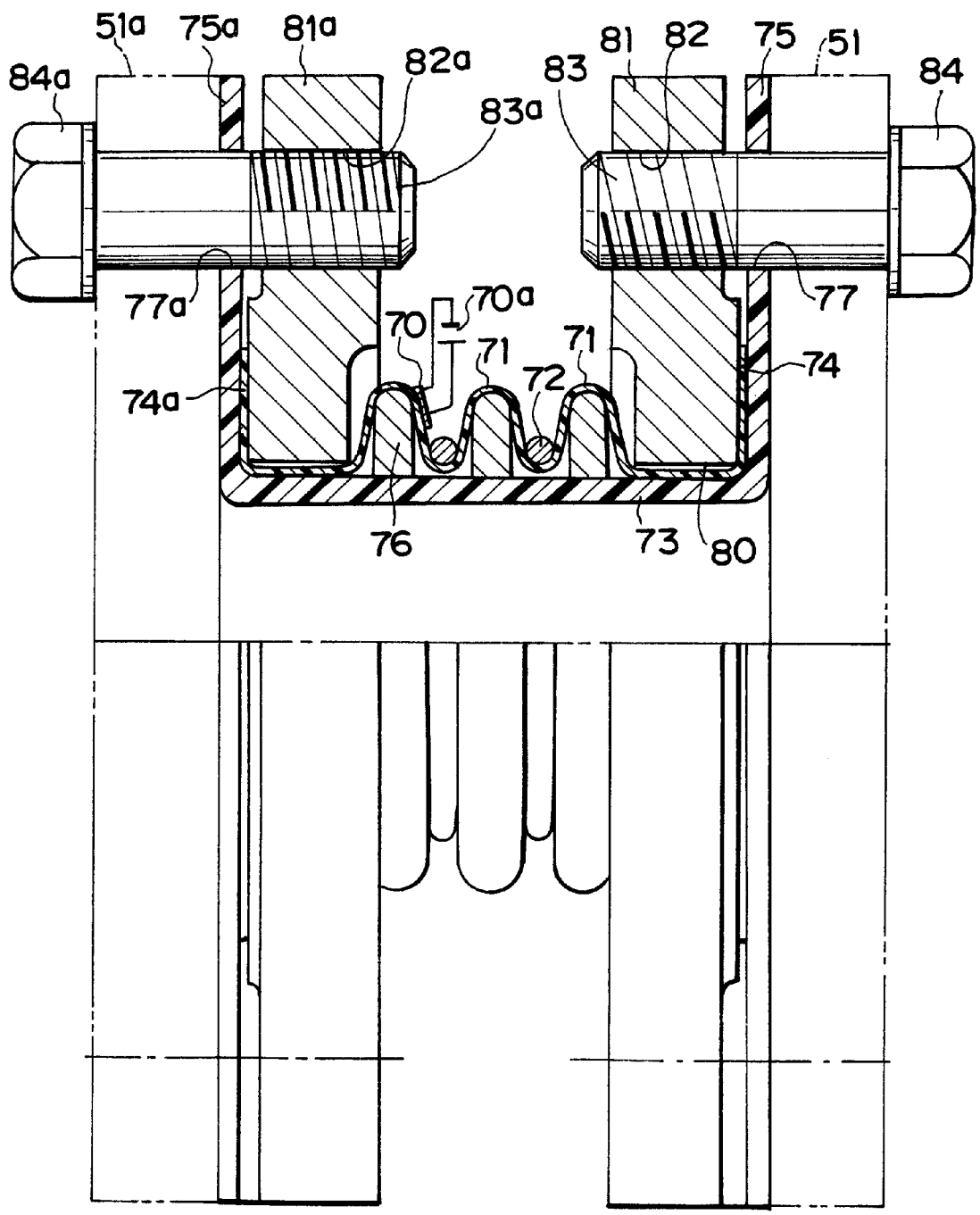
FIG. 5 is a partially cut-off vertical cross-sectional view showing the fifth embodiment of the expansion joint device according to the present invention.

Reinforcement rings 32 are respectively and individually filled and inserted to each of the grooves formed to the outer peripheral surface of the bellows-type outer cylinder 31, thereby supporting the grooves from the outer peripheral side and preventing excessive expansion or deformation of the bellows. The reinforcement rings 32 as shown in FIGS. 1 and 2 are formed of cast iron, for example FC200, or an aluminum alloy, for example AC7, and so on. Each reinforcement ring 32 constitutes a stopper portion 32a having an outer circumference portion protruded in the outward direction from the bellows-type outer cylinder, the outer peripheral end having a predetermined width w in the axial direction of the joint. When the bellows-type outer cylinder 31 shrinks in the axial direction, the adjacent stopper portions 32 come into contact with one another, and defines the minimum length of the expansion joint device. The reinforcement ring 32a can be a stainless steel ring having a circular cross-section, as shown in FIG. 5.

A screw shaft 42 is inserted to a bore formed to each of guide flanges 26, 26a equiangularly positioned around the axis and extending from the end pipes 23, 23a toward the radially outward direction, and a pair of nuts 29 are screwed onto the screw shaft 42 from the both sides of the guide flange 26, 26a, thereby temporarily fastening the mounting arms.

A cylindrical resin film 33, which is the characteristic feature of the present invention, is mounted substantially coaxially in the interior of the end pipes 23, 23a and the bellows-type outer cylinder 31, the intermediate cylindrical region 34 thereof substantially coaxially wrapping the whole inner surface of the end pipes 23, 23a and the bellows-type outer cylinder 31. Thereby, the cylindrical resin film 34 is supported by the inner surface of the end pipes 23, 23a and the inner ridge regions of the bellows-type outer cylinder 31.

Both end regions of the cylindrical resin film 33 are equipped with a flare region 35, 35a extending in the radial direction in a flat disk-shape. Each of flare region 35, 35a is inserted and supported between the flange region 21, 21a formed to both end regions of the device and a flange region 51, 51a of the piping and the like placed adjacent thereto, the flange regions 21, 21a, 51, 51a being fixed and connected in a leakproof manner to the connecting passage end region 20, 20a through common fastening of the fastening members 24, 24a such as bolt-nut members. In this structure, the cylindrical region 34 of the cylindrical resin film 33 is not fixed or connected to other members.

It is necessary for the cylindrical resin film 33 to have no permeability to the flowing fluid such as beer. If the film has permeability, the fluid penetrates into the interior of the bellows-type outer cylinder 31 and resides to the area, causing insanitation and quality deterioration of the fluid, and moreover, the cylindrical region 34 will be pushed into the grooves on the inner surface of the bellows-type outer cylinder 31 which may cause the cylinder to break, and making it difficult for the device to achieve its initial object.

Preferably, the composition of the cylindrical resin film 33 should have advantageous elasticity, since it is necessary for the film to correspond to the expansion and contraction of the device. Moreover, from a hygienic point of view, the food must go through a heat sterilization process, and therefore the film should preferably be heat resistant, chemical resistant, and durable. Actual examples of the material for the film are silicon, rubber and the like.

Since the expansion passage region 30 adjusts the axial direction length thereof through its expansion and contraction, the cylindrical resin film 33 is capable of expanding and contracting corresponding to the movement of the region. The film should be set so that it will not sag when contracted to the minimum length, and should preferably be provided with pretension.

When it is necessary to provide elasticity, a resin having high elasticity should preferably be used. A preferable example of a highly elastic resin is the formerly mentioned ST silicon. The ST silicon has prominently advanced properties in many ways compared to the general-purpose silicon rubber, as shown in the following table, and it is further characterized in that it enables both bonding and welding, which eliminates the need for molds during the processing of the cylindrical resin film, and thereby reduces the processing cost. Moreover, as shown in the following test example, the ST silicon is advantageous in tension strength, tear strength, elastic elongation limit, durability (5 to 10 times that of general-purpose silicon rubber), chemical resistance, safety and the like, which makes it appropriate for application to an expansion joint device for fluid used for food and drinks, electronic products, drugs and the like requiring sanitary environment, capability of maintaining the quality of the fluid, and chemical resistance, and it has passed the Notification No. 85 general standard test provided by the Ministry of Welfare of Japan.

TABLE

| Test Item: | ST Silicon | General Silicon |
| --- | --- | --- |
| Hardness Ha (Jis): | 50 | 51 |
| Tension Strength (Kgf/cm): | 115 | 77 |
| Elongation Ratio % | 700 | 300 |
| Tear Strength (Kgf/cm): | 53 | 13 |

An air hole 60 connected to the space between the bellows-type outer cylinder 31 and the cylindrical resin film 33 is formed to the end pipe 23 or 23a, and releases the space to the atmosphere. If by any cause the cylindrical resin film 33 breaks and fluid leaks from the interior to the space through the defected region, the fluid will leak out to the exterior through the air hole 60. Therefore, the user can detect the abnormal state caused in the cylindrical resin film 33 at a very early stage, and can therefore take necessary action. A relief valve that opens upon receiving a predetermined amount of pressure and releases the space to the atmosphere, or a manually or electromagnetically driven valve 61 may be provided to the air hole 60. When the valve opens by the internal pressure within the space increasing to a predetermined value and the like, the air pressure within the space is released to the atmosphere.

The operation of the afore-mentioned first embodiment will now be explained.

Fluid food or beverage such as beer flows through the interior of the expansion joint device 10 in arrow A direction. At this time, the cylindrical resin film 33 contacts the peak regions of the ridge formed to the inner peripheral surface of the cylindrical region 34 of the bellows-type outer cylinder 31, thereby sealing the groove spaces, being prevented from entering deep into the inner surface of the grooves by the operation of t he pressure within the sealed spaces. Further, the cylindrical region 34 of the expansion passage region 30 is made of resin and has a substantially flat inner surface. According to these features, the fluid is guided smoothly through the cylindrical region 34, and will travel through the expansion joint device 10 without causing residence thereof, thereby maintaining an excellent sanitary environment of the fluid passage.

Moreover, since no impurities will be deposited within the groove spaces formed to the inner surface of the bellows, the problem of impurity deposition flowing into the passage outside the expansion joint device 10 by any cause is solved.

FIG. 2 shows a second embodiment of the present invention, which further contrives the first embodiment by providing a structure to further prevent the cylindrical resin film 33 from being inserted deeply into the inner groove regions of the bellows.

According to the second embodiment, a plural number of low-hardness elastic resin filling rings 41 are filled to the spaces 36 formed by the inner peripheral grooves of the bellows-type outer cylinder 31, and forming the inner shape of the bellows-type outer cylinder 31 so that it is substantially cylindrically smooth. The plural number of elastic resin filling rings 41 are connected at their inner peripheral surfaces, constituting a flat surface that is substantially flush with the peak regions of the inner peripheral surface of the bellows in the bellows-type outer cylinder 31. Therefore, irrespective of the hardness or the elasticity of the cylindrical resin film 33, the inner surface shape of the bellows-type outer cylinder 31 becomes substantially smooth in a cylindrical shape, the smooth cylindrical inner surface supporting the cylindrical resin film to maintain a smooth surface even when the film is expanded by fluid pressure, forming no residual space of the fluid within the device. According to such feature of the invention, the fluid flow is maintained hygienically and the quality of the fluid is maintained.

The elastic resin filling rings 41 can either be formed separately and fit to each proove spaces of the bellows, or formed by filling soft resin in the groove spaces, and leaving it for a predetermined time for the resin to cure.

In another example, the elastic resin filling rings 41 may be designed as an integral cylindrical member that covers even the peaks of the ridge regions on the inner peripheral surface of the bellows-type outer cylinder 31.

Depending on the environment in which it is used, the low-hardness elastic resin should preferably have heat resistance, and should not erode the peripheral structural material such as stainless, the preferable example of which is the above-mentioned ST silicon.

Figure 3:
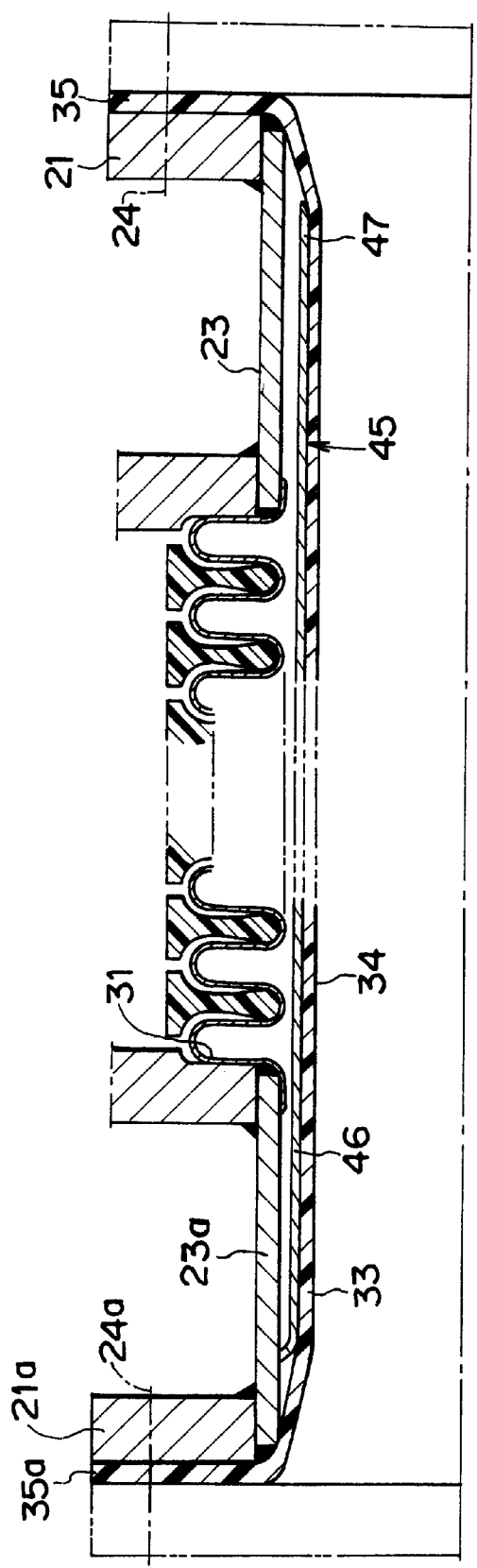
FIG. 3 is a partial vertical cross-sectional view showing the third embodiment of the expansion joint device according to the present invention.
Figure 4:
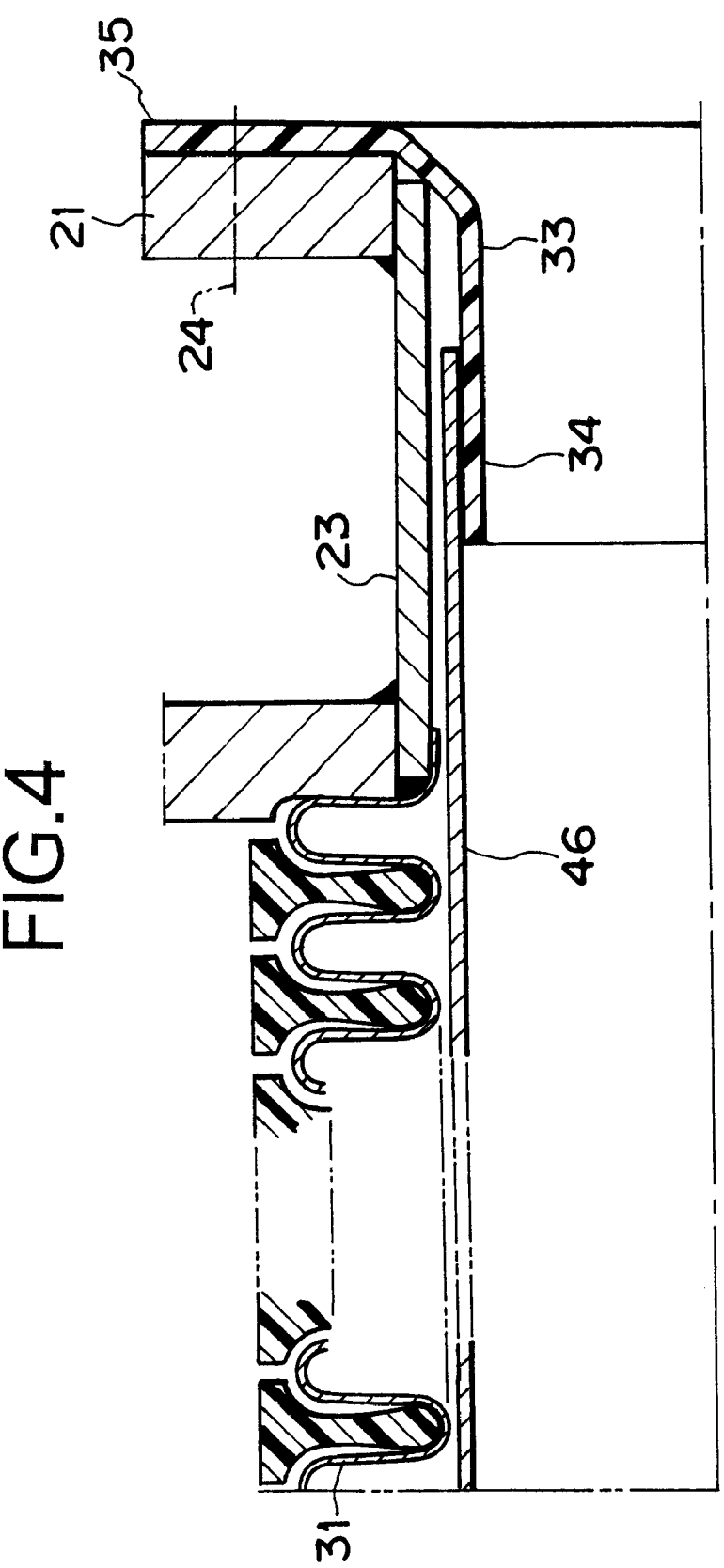
FIG. 4 is a partial vertical cross-sectional view showing the fourth embodiment of the expansion joint device according to the present invention.

As shown in the third embodiment of the present invention shown in FIGS. 3 and 4, the expansion device can be equipped with a metal cylindrical sleeve 46 mounted substantially coaxially to the interior of the bellows-type outer cylinder 33 explained in FIG. 1, thereby protecting the cylindrical resin film 33.

That is, in FIG. 3, a metal cylindrical sleeve 46 is arranged coaxially with the end pipe 23a, the one axial end portion of which is radially widened, the end rim being fixed in a leakproof manner to the inner peripheral surface of the end pipe 23a by means of welding and the like. The other end of the metal cylindrical sleeve 46 is axially extended in the inner side of the bellows-type outer cylinder 31 and reaches the other end pipe 23, which is slidably superposed on the end pipe 23 constituting a double (inner and outer) layer.

Similarly as the former two embodiments, the cylindrical resin film 33 is fixed in a leakproof manner to the connecting passage ends 20, 20a with the flare region 35, 35a being inserted and fastened between the flange region 21, 21a and the flange regions of adjacent piping and the like.

The means for fixing and connecting the film to the connecting passage ends 20, 20a can be selected from any known method, including inserting the film between flanges, welding, bonding, or a combination of these methods.

For example, the position for connecting the cylindrical resin film 33 is not limited to the flange region, but as shown in FIG. 4 explaining the fourth embodiment of the invention, the film 33 can be fixed by welding one end onto the inner peripheral surface on the inner end of the metal cylindrical sleeve 46 in a leakproof manner, while inserting the flare region 35 formed to the other end thereof between the flange region 21 of the connecting passage end 20 and the flange region of the adjacent piping.

FIG. 5 shows the fifth embodiment of the present invention wherein the bellows-type outer cylinder is made of polytetrafluoroethylene instead of metal, and the axial length of the joint is reduced.

A bellows-type outer cylinder 71 comprises three annular heap regions formed in the axial direction, and to each groove regions formed to the outer peripheral surface thereof is placed a metal reinforcement ring 72 having a round cross section, which prevent the bellows-type outer cylinder 71 from expanding outward excessively by the pressure of the inner fluid.

Low-hardness elastic resin filling rings 76 are filled to each of the groove regions formed to the inner peripheral surface of the bellows-type outer cylinder 71, the inner peripheral surface of the elastic resin filling layer 76 being substantially flush with the inner peripheral surface of the bellows-type outer cylinder 71, continuously constituting a fluid passage having a substantially flat cylindrical inner surface.

The connecting passage end regions constituting both ends of the joint in the axial direction comprises a flange 81, 81a each equipped with a fluid passage 80 formed in the center area thereof, connecting bolts 83, 83a constituting a fastening member are each inserted to a screw hole 82, 82a formed to the flanges 81, 81a respectively, and a bolt inserting hole formed to adjacent piping and the like 51, 51a respectively, which is screwed so as to connect the expansion joint device to piping and the like 51, 51a.

Both axial ends of the bellows-type outer cylinder 71 and the cylindrical resin film 73 are equipped with flare regions 74, 74a and 75, 75a, which are radially widened along a surface orthogonal to the axis. The flare regions 74, 74a of the bellows-type outer cylinder 71 come into contact with the axial outer surface of the flanges 81, 81a, and the flare regions 75, 75a of the cylindrical resin film 73 contact the outer surface of the flange regions of the adjacent pipes and the like 51, 51a, both being inserted between the flanges 81, 81a and the flanges 81, 81a of the piping and the like, and fastened thereto in a leakproof manner.

The outer peripheral region of each flare region 75, 75a of the cylindrical resin film 73 is protruded outward from the bellows-type outer cylinder 71 and extends greatly in the radial direction with bolt inserting holes 77, 77a formed to have equal distances in the circumferential direction, through which are inserted connecting bolts 83, 83a for pulling the cylindrical resin film 73 and providing pretension to the film in the axial direction. Therefore, even when the cylindrical resin film 73 contracts in the axial direction, it will not become lax, enabling the fluid inside the cylindrical resin film 73 to flow smoothly without causing residence.

Moreover, a strain gage 70 including a capacitor 70a is adhered to the outer surface of the bellows-type outer cylinder 71 for detecting the expansion strain of the cylinder 71. The detected strain is transmitted to a known measurement device as electric signals, where the level of the strain is detected. When the cylindrical resin film 73 is damaged and the fluid inside leaks to the area between the cylindrical resin film 73 and the bellows-type outer cylinder 71, the outer cylinder 71 tries to expand by the received fluid pressure and causes strain of the cylinder, so by detecting the strain the damage of the cylindrical resin film 73 is noticed at a very early stage, and measures can be taken quickly.

Other advantages of embodiment 5 are the same as those of the foregoing embodiments.

Figure 6:
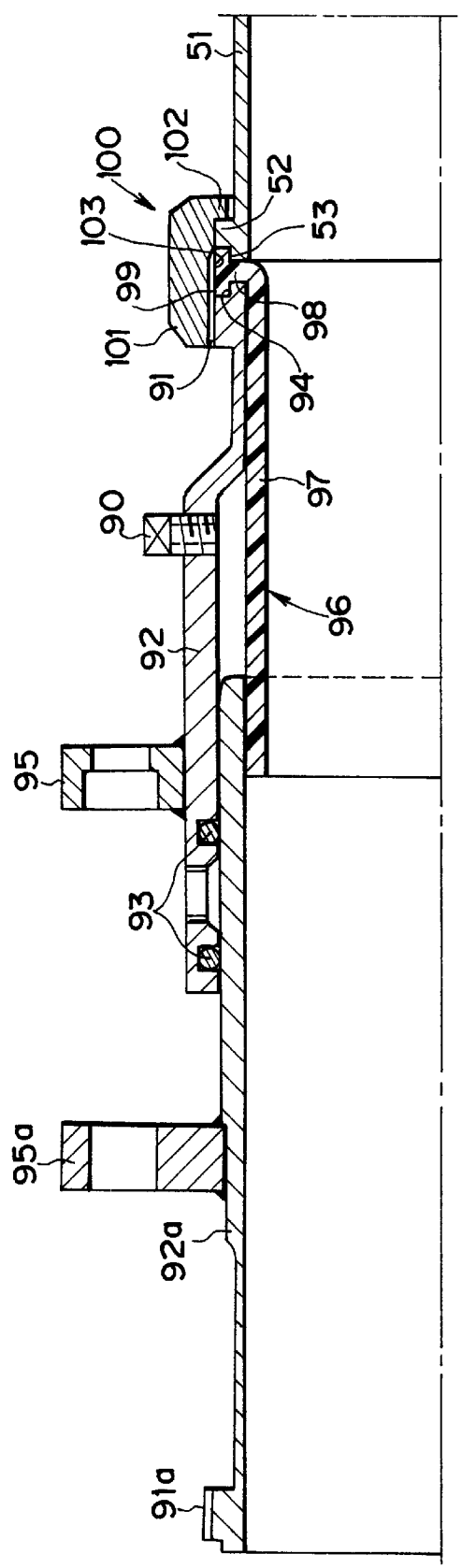
FIG. 6 is a partial vertical cross-sectional view showing the sixth embodiment of the expansion joint device according to the present invention.

Next, the sixth embodiment shown in FIG. 6 will be explained.

The present embodiment constitutes a slip-pipe-type expansion outer cylinder using a metal cylindrical inner sleeve and outer sleeve instead of using the bellows-type outer cylinder as the expansion outer cylinder.

An outer sleeve 92 and an inner sleeve 92a can be integrally connected to the connecting passage ends, but the present embodiment formed the sleeves so that they act also as the connecting passage ends. The axial inner end regions of the outer sleeve 92 and the inner sleeve 92a are mutually superposed concentrically, and instead of forming a flange region to the axial outer end regions, the outer peripheral of the outer end regions are respectively equipped with screws 91, 91a, which are to be respectively screwed onto the ends of other adjacent piping and the like 51 not shown, thereby connecting the expansion joint device to the piping structure.

O-rings 93 are mounted to the superposed inner end regions of the outer sleeve 92 and the inner sleeve 92a, which enable the outer and inner sleeves 92, 92a to mutually slide in the axial directions in a leakproof manner. One end region of the cylindrical resin film 96 is either bonded or welded onto the inner peripheral surface of the inner sleeve 92a in a leakproof manner, and the other end region of the cylindrical resin film 96 is connected in a leakproof manner to the screw union 100 formed to the outer end of the outer sleeve 92. T he screw union 100 is equipped with a nut 101 capable of sliding at the end region of the piping and the like 51 in the axial direction and further capable of rotating around the axis. The axial sliding movement of the nut 101 is restrained by a small-diameter region 102 formed to one end of the nut 101 being bordered on an annular protrusion 52 formed to the end of the piping and the like 51. Moreover, an internal screw region 103 formed to the inner peripheral surface on the other end of the nut 101 screws onto the screw 91 formed to the outer end of the outer sleeve 92, thereby screwing and connecting the outer sleeve 92 onto the piping and the like 51.

The end region of the cylindrical resin film 96 comprises a small-diameter flare region 98, with an enlarged region 99 formed to the periphery thereof. The enlarged region 99 is fit to grooves 94 and 53 formed in advance to the outer end region of the outer sleeve 92 and the outer end region of the piping and the like 51, and in such state, the flare region 98 is sandwiched and fixed between the outer sleeve 92 and the outer end of the piping and the like 51. The flare region 98 also functions as packing.

It is clear from the various embodiments that the connecting and fixing of both ends of the cylindrical resin film can be selected and designed arbitrarily, including welding, adhering or providing a flare region thereto. Moreover, the ends of the cylindrical resin film can be connected by arbitrary means, such as connecting both ends using a similar fixing means, or by applying at least one means explained in the embodiment to at least one end of the cylindrical resin film.

However, the region at the end of the cylindrical resin film being connected to the connecting passage end region 20 must be selected from the areas excluding the metallic cylindrical sleeve 46 and the end pipe 23 superposed with the sleeve 46, or the mutually slidable region of the inner and outer sleeves 92 and 92a.

The axial length of the cylindrical region in the cylindrical resin film that is not connected to other members must be decided with respect to the properties of the material of the cylindrical resin film, such as the elasticity limit of the film. If the cylindrical region is too short, repeated stress from expansion or heat may cause fatigue destruction of the film, with no room for dispersion of the stress. In this sense, the ST silicon material is advantageous in that it is capable of expanding outstandingly.

INDUSTRIAL APPLICABILITY

The expansion joint device according to the present invention can be applied to any general pipe joints, and it can be applied to many fields, especially for the piping system of food and beverage fluid, drugs, and electronic component fluid. Especially, the present is applied advantageously to expansion joints requiring hygienic property, quality-maintaining property, chemical resistance and durability.

I claim:

1. An expansion joint device comprising:
   a pair of connecting passage end regions equipped to both axial ends thereof;
   an expansion outer cylinder capable of expanding and contracting in the axial direction, with one axial end region thereof substantially connected in a leakproof manner to one of said connecting passage end regions and the other axial end region thereof substantially connected in a leakproof manner to the other of said connecting passage end regions; and
   a cylindrical resin film having no permeability to fluid flowing therethrough and having flexibility in the axial direction, which is substantially concentrically arranged within the interior of said expansion outer cylinder with one axial end thereof substantially connected in a leakproof manner to one of said connecting passage end regions and the other axial end thereof substantially connected in a leakproof manner to the other of said connecting passage end regions, the-cylindrical intermediate region of said cylindrical resin film being arranged to cover the inner surface of said expansion outer cylinder in a leakproof manner; wherein
   each of said connecting passage end regions is connected with a connecting body of another passage adjacent thereto in condition that axial pretension is provided to said cylindrical resin film.

2. An expansion joint device comprising:
   a pair of connecting passage end regions equipped to both axial ends thereof;
   a bellow-type expansion outer cylinder capable of expanding and contracting in the axial direction, with one axial end region thereof substantially connected in a leakproof manner to one of said connecting passage end regions and the other axial end region thereof substantially connected in a leakproof manner to the other of said connecting passage end regions; and
   a cylindrical resin film having no permeability to fluid flowing therethrough, which is substantially concentrically arranged within the interior of said expansion outer cylinder to form a passage of fluid, with one axial end thereof substantially connected in a leakproof manner to one of said connecting passage end regions and the other axial end thereof substantially connected in a leakproof manner to the other of said connecting passage end regions, the cylindrical intermediate region of said cylindrical resin film being arranged to cover the inner surface of said expansion outer cylinder in a leakproof manner; and a plural number of low-hardness elastic resin filling rings filled to each of the spaces defined by grooves formed to an inner peripheral surface of said expansion outer cylinder, the inner surfaces of said rings forming a substantially continuously cylindrical surface.

3. An expansion joint device according to claim 2, wherein said plural elastic resin filling rings are connected and formed integrally, thereby constituting a substantially smooth cylindrical inner peripheral surface.

4. An expansion joint device according to claim 2, wherein said expansion outer cylinder is made of metal.

5. An expansion joint device according to claim 2, wherein said expansion outer cylinder is made of polytetrafluoroethylene.

6. An expansion joint device according to claim 2, further comprising reinforcement rings positioned to the groove regions formed to the outer circumferential surface of said expansion outer cylinder for preventing expansion of said expansion outer cylinder in the radial direction.

7. An expansion joint device according to claim 2, wherein a flare region mounted to at least one end of said cylindrical resin film is sandwiched between and fixed to the corresponding connecting passage end region and a connecting body of another passage adjacent to said end region.

8. An expansion joint device according to claim 7, wherein said connecting passage end region and said connecting body adjacent to said end region are connected together by a fastening member including a bolt-nut, and said flare region comprises a bolt inserting hole through which said bolt is inserted in said connected state.

9. An expansion joint device according to claim 7, wherein said connecting passage end region and said connecting body adjacent to said end region are connected together by a screw union joint structure, and said flare region comprises an expanded region that fits to a groove formed in advance to said connecting passage end region in said connected state.

10. An expansion joint device according to claim 2, wherein said cylindrical resin film has at least one end connected integrally in a leakproof manner to said corresponding connecting passage end region.

11. An expansion joint device according to claim 2, wherein said cylindrical resin film is formed of highly elastic resin.

12. An expansion joint device according to claim 2, further comprising a device for detecting breakage of said cylindrical resin film.

13. An expansion joint device according to claim 12, wherein said device for detecting breakage of said cylindrical resin film comprises an air hole formed to said connecting passage end region for releasing a space formed between said expansion outer cylinder and said cylindrical resin film to the atmosphere.

14. An expansion joint device according to claim 12, wherein said device for detecting breakage of said cylindrical resin film is a device for measuring strain mounted on said expansion outer cylinder.

15. An expansion joint device according to claim 12, wherein said device for detecting breakage of said cylindrical resin film is a valve for releasing a space formed between said expansion outer cylinder and said cylindrical resin film to the atmosphere.

16. An expansion joint device according to claim 2, wherein each of said connecting passage end regions is connected with a corresponding connecting body so that axial pretension is provided to said cylindrical resin film.

17. An expansion joint device comprising:

a pair of connecting passage end regions equipped to both axial ends thereof;

an expansion outer cylinder capable of expanding and contracting in the axial direction, with one axial end region thereof substantially connected in a leakproof manner to one of said connecting passage end regions and the other axial end region thereof substantially connected in a leakproof manner to the other of said connecting passage end regions; and a cylindrical resin film having no permeability to fluid flowing therethrough, which is substantially concentrically arranged within the interior of said expansion outer cylinder with one axial end thereof substantially connected in a leakproof manner to one of said connecting passage end regions and the other axial end thereof substantially connected in a leakproof manner to the other of said connecting passage end regions, the cylindrical intermediate region of said cylindrical resin film being arranged to cover the inner surface of said expansion outer cylinder in a leakproof manner; and a cylindrical metal sleeve that is substantially concentrically arranged within the interior of said expansion outer cylinder, one axial end thereof connected to one of said connecting passage end regions in a leakproof manner; wherein said cylindrical resin film seals an opening between a free end of said cylindrical metal sleeve and said expansion outer cylinder, and forms a linear passage of fluid therethrough.

18. An expansion joint device according to claim 17, wherein one axial end of said cylindrical resin film is substantially connected in a leakproof manner to one of said connecting passage end regions via said cylindrical metal sleeve with one end of said cylindrical metal sleeve connected to one of said connecting passage end regions and said free end of said cylindrical metal sleeve connected to one axial end of said cylindrical resin film, and the other axial end of said cylindrical resin film is substantially connected in a leakproof manner to the other of said connecting passage end regions, said cylindrical resin film together with said cylindrical metal sleeve being arranged to cover the inner surface of said expansion outer cylinder in a leakproof manner.

19. An expansion joint device according to claim 17, wherein said expansion outer cylinder is a bellows-type outer cylinder.

20. An expansion joint device according to claim 17, wherein each of said connecting passage end regions is connected with a corresponding connecting body so that axial pretension is provided to said cylindrical resin film.

21. An expansion joint device comprising:

a pair of connecting passage end regions equipped to both axial ends thereof;

an expansion outer cylinder capable of expanding and contracting in the axial direction, with one axial end region thereof substantially connected in a leakproof manner to one of said connecting passage end regions and the other axial end region thereof substantially connected in a leakproof manner to the other of said connecting passage end regions; and a cylindrical resin film having no permeability to fluid flowing therethrough, which is substantially concentrically arranged within the interior of said expansion outer cylinder with one axial end thereof substantially connected in a leakproof manner to one of said connecting passage end regions and the other axial end thereof substantially connected in a leakproof manner to the other of said connecting passage end regions, the cylindrical intermediate region of said cylindrical resin film being arranged to cover the inner surface of said expansion outer cylinder in a leakproof manner; wherein said expansion outer cylinder comprises an inner sleeve and an outer sleeve, the axial inner ends of said inner and outer sleeves being concentrically superposed enabling mutual axial slide movement, the respective outer ends thereof being connected to corresponding connecting passage end regions in a leakproof manner;

each end of said cylindrical resin film being connected in a leakproof manner to a portion of connecting passage end regions and said inner and outer sleeves respectively, said portion being other than the region allowing mutual slide movement of both sleeves;

said cylindrical resin film being arranged to cover the gap between said inner and outer sleeves;

said inner sleeve being partially exposed to the interior of a connecting passage to form a passage of fluid together with said cylindrical resin film; and each of said connecting passage end regions is connected with a corresponding connecting body so that axial pretension is provided to said cylindrical resin film.

22. An expansion joint device comprising:

a pair of flanges equipped to both axial ends of said expansion device;

a bellows-type expansion outer cylinder having both axial ends substantially fixed to said flanges and capable of expanding and contracting in the axial direction;

a cylindrical resin film arranged substantially concentrically within the interior of said expansion outer cylinder, having both ends thereof substantially fixed to said pair of flanges;

low-hardness elastic resin filling rings filled to each of the spaces defined by grooves formed to an inner peripheral surface of said expansion outer cylinder, and forming a substantially continuously cylindrical surface to interior of a connecting passage; and reinforcement rings respectively mounted to each groove region formed to the outer peripheral surface of said expansion outer cylinder; wherein said expansion outer cylinder comprises first flare regions formed to both axial ends of said bellows respectively, one of said first flare regions being substantially connected in a leakproof manner to the axially outer side surface of one of said flanges and the other of said first flare regions being substantially connected in a leakproof manner to the axially outer side surface of the other flange;

said cylindrical resin film comprises second flare regions formed to both axial ends thereof respectively, one of said second flare regions being sandwiched with pressure between said one flange and a flange region of an axially adjacent passage, and the other second flare region being sandwiched with pressure between said other flange and a flange region of an axially adjacent passage; and said cylindrical resin film being supported by said elastic resin filling rings from outward to form an axially linear passage of fluid.

23. An expansion joint device according to claim 22, wherein said expansion outer cylinder is made of polytetrafluoroethylene.

24. An expansion joint device according to claim 22, wherein said flange and said flange region of another passage adjacent to said flange are connected by a bolt-nut-type fastening member, and said second flare regions of said cylindrical resin film each comprise a hole through which a bolt of said fastening member penetrates.

* * * * *